United States Patent [19]

Ban et al.

[11] 4,369,388
[45] Jan. 18, 1983

[54] DIRECT CURRENT MOTOR WITH NON-SUPERPOSED ARMATURE WINDINGS

[76] Inventors: Itsuki Ban, 829 Higashi-Oizumimachi, Nerima-ku, Tokyo; Manabu Shiraki, 4451-171 Shimotsuruma, Yamato-shi, Kanagawa-ken; Hideo Okada, 3-34-29 Kugayama, Siginami-ku, Tokyo; Kazuhito Egami, 2-44-1 Chuo, Nakano-ku, Tokyo, all of Japan

[21] Appl. No.: 237,518

[22] Filed: Feb. 23, 1981

Related U.S. Application Data

[63] Continuation of Ser. No. 970,857, Dec. 19, 1978, abandoned.

[30] Foreign Application Priority Data

Dec. 22, 1977 [JP] Japan .................. 52-153627

[51] Int. Cl.$^3$ ........................................... H02K 21/26
[52] U.S. Cl. .................................. 310/154; 310/198
[58] Field of Search .................... 310/268, 68 R, 154, 310/46, DIG. 3, 177, 89, 233, 156, 198–208

[56] References Cited

U.S. PATENT DOCUMENTS

| | | | |
|---|---|---|---|
| 1,157,014 | 10/1915 | Lippelt | 310/202 |
| 3,686,521 | 8/1972 | Henry-Baudot | 310/268 |
| 3,993,920 | 11/1976 | Sato | 310/268 |
| 4,072,881 | 2/1978 | Ban | 310/268 |
| 4,093,882 | 6/1978 | Furuta | 310/154 |
| 4,107,587 | 8/1978 | Ban et al. | 310/202 |
| 4,143,288 | 3/1979 | Sato | 310/154 |
| 4,164,675 | 8/1979 | Sato et al. | 310/268 |
| 4,243,902 | 1/1981 | Ban | 310/154 |
| 4,260,920 | 4/1981 | Nakamura | 310/156 |

FOREIGN PATENT DOCUMENTS

2146893 4/1973 Fed. Rep. of Germany ... 310/DIG. 3

*Primary Examiner*—R. Skudy
*Attorney, Agent, or Firm*—Kenway & Jenney

[57] ABSTRACT

A direct current motor is provided with a field magnet having 4 mn alternating N and S poles (m being a positive integer of one or more and n being a positive integer of two or more) that are magnetized within segments of equi-angular width about the field magnet, a magnetic-material member for closing the magnetic path of the field magnet, and a rotatably mounted armature having m (2n−1) armature windings equally distributed thereabout in a non-superposed manner with respect to each other and in a face-to-face relationship with respect to the field magnet poles, each winding having an angular spacing between those conductor portions thereof that contribute to the generation of the torque that is equal to the angular width of the field magnet poles.

4 Claims, 7 Drawing Figures

DIRECT CURRENT MOTOR WITH NON-SUPERPOSED ARMATURE WINDINGS

This is a continuation of application Ser. No. 970,857, filed Dec. 19, 1978, now abandoned.

BACKGROUND OF THE INVENTION

This invention relates to a direct current (DC) motor which has, for 4n poles (n being a positive integer of 2 or more) of its field magnet, (2n-1) armature windings which are disposed on a disk-shaped or cylindrical armature in a non-superposed manner with respect to each other or in a single layer.

In conventional DC motors having a plurality of armature windings, the windings are generally disposed on the armature in such a manner that the windings are superposed on each other in multiple layers. In the manufacture of such conventional DC motors, substantial labor is required for processing the edge portions of the superposed windings, the labor requirement impeding the convenient mass production of the motors. If a plurality of armature windings are resin molded and solidified into a unit for disposition on an armature, the resultant armature assembly will have an increased thickness because the armature windings are superposed on each other in multiple layers. This increased thickness of the armature will substantially reduce the effective magnetic field, which passes through the armature, of the field magnet, thus resulting in decreases in motor efficiency and starting torque.

SUMMARY OF THE INVENTION

The above-mentioned drawbacks in the prior art motor have been successfully eliminated by the present invention.

Accordingly, an object of the invention is to provide a DC motor which has a lower number of armature windings, is especially suited to mass production, and is low in cost.

Another object of the invention is to provide a DC motor in which the effective length of those conductor portions of the armature winding that contribute to the generation of torque is sufficiently large as compared with the length of the other portions, which contribute to the copper loss, that the efficiency of the motor is increased.

A DC motor according to the invention is provided with a field magnet having 4mn poles (m being a positive integer of 1 or more and n being a positive integer of 2 or more) which are magnetized alternately into N- and S-polarities in equal angular spaces, a magnetic material member for closing the magnetic path of the field magnet, m (2n-1) armature windings disposed on an armature, each winding having; an angular spacing of conductor portions thereof which contribute to the generation of torque, which spacing is equal to the angular width of the field magnet pole, the armature windings equally distributed about the armature in a non-superposed manner thereon at equal pitches in a non-superposed fashion with respect to each other and in a face-to-face relationship with respect to the field magnet poles, and a shaft for supporting either the armature or the field magnet for rotation, the shaft journalled by bearings provided in a motor housing.

These and other objects and features of the invention will become apparent from the following description of the preferred embodiments taken in conjunction with the accompanying drawings.

BRIEF DESCRIPTION OF THE DRAWINGS

FIG. 1b is a plan view of the field magnet poles in the motor of FIG. 1a;

FIG. 1c is a plan view of the armature in the motor of FIG. 1a;

DETAILED DESCRIPTION OF THE PREFERRED EMBODIMENTS

Figure 1A:
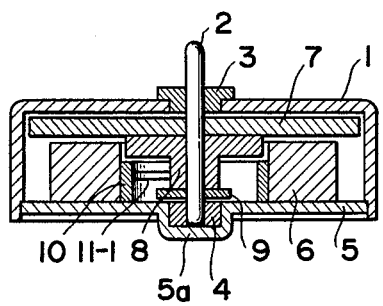
FIG. 1a is a longitudinal cross-sectional view of a motor of the present invention.
Figure 1B:
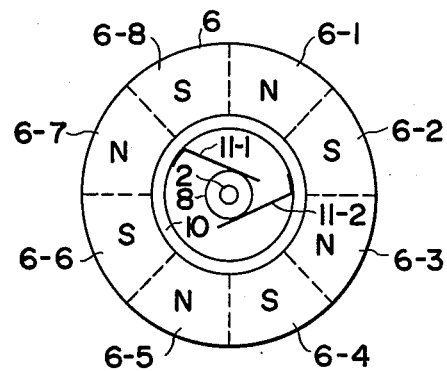
Figure 1C:
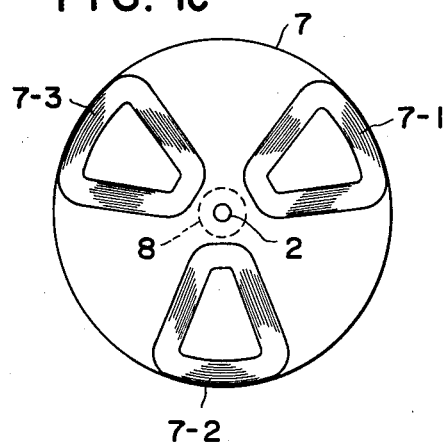

The specification describes an exemplary embodiment of a DC motor in accordance with the present invention which is provided with eight field magnet poles and three armature windings. FIGS. 1a, 1b, and 1c illustrate the structure of a commutator motor which is provided with a disk-shaped armature. In FIG. 1a, the numeral 1 indicates a circular, cup-shaped housing which is made by press forming a soft steel plate. A soft steel disk 5 is forced into the lower, open end portion of the housing 1 and is secured therein to provide a bottom plate for the housing. The disk 5 has a circular depression 5a formed in the central portion thereof. The housing 1 and the disk 5 are adapted to constitute and close the magnetic path in the motor. Bearings 3 and 4 are secured, respectively, to the housing 1 and the circular depression 5a and a rotatable shaft 2 which has one end thereof pressed against and abutting the inner surface of the depression 5a. An annular field magnet 6 is secured to the inner surface of the disk 5. An armature 7 (as a rotor) and an integrally molded commutator 8 are secured to the shaft 2. A washer 9 is fitted to the shaft 2, under the commutator 8, and functions as an oil shield. The armature 7 is placed within the magnetic field which appears between the housing 1 and the field magnet 6. The field magnet 6 consists of poles 6-1, 6-2, ..., 6-8 which are of alternate N- and S-polarities, each subtending an angular space of 45°, as shown in FIG. 1b. A cylindrical plastic molded member 10 is fitted in the central opening of the annular field magnet 6. Brushes 11-1 and 11-2 are, at their base end portions, secured to the inner surface of the cylindrical member 10 and are in sliding contact, at their free end portions, with the commutator 8. FIG. 1c illustrates the structure of the armature 7 which includes sectorial armature windings 7-1, 7-2 and 7-3 embedded in a plastic disk at equal pitches, that is, each within a 120° angular space. The angular spacing of those conductor portions of the sectorial armature windings that contribute to the generation of torque is 45° which is equal to the angular width of each of the field magnet poles 6-1, 6-2, ..., 6-8. With this configuration of the armature winding, the length of the outer and inner peripheral portions, which contribute to the copper loss, of the armature winding can be relatively short as compared with the radial length of the conductor portions which contribute to the generation of the torque, thus advantageously increasing efficiency. This configuration of the armature windings is especially desirable for increasing the efficiency of the motor and for increasing the efficiency of motors in which such windings are applied to a cylindrical armature (not shown). Such armature windings can be conveniently formed by frame winding self-bonding wire. As described hereinafter, though the three armature windings constitute three-phase armature windings, are wound in a juxtaposed fashion in a plane (FIG. 1c), and are not being superposed on each other in multiple layers as in the conventional three-phase windings, and, accordingly, the windings allow the fabrication of small-thickness armatures. Accordingly, distance between the field magnet 6 and housing 1 (FIG. 1a) can be made small to obtain a stronger magnetic field resulting in increased efficiency and torque. In the armature 7 shown in FIG. 1c, three sectorial armature windings are juxtaposed with respect to each other in a plane and are embedded in the armature 7, and accordingly the armature is easy to manufacture and especially suited to mass production.

Figure 2:
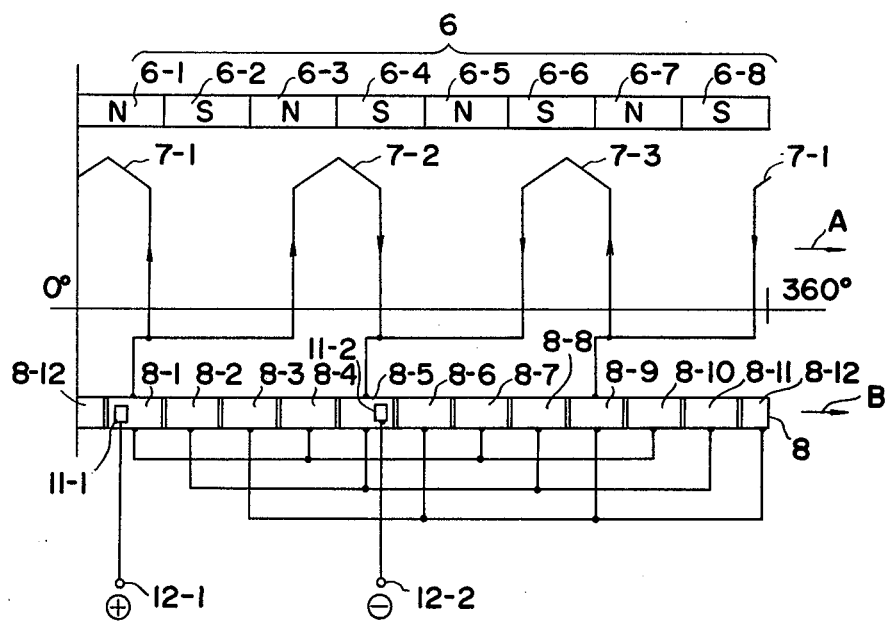
FIGS. 2 and 3 are developed views of embodiments incorporating the field magnet poles shown in FIG. 1b and the armature windings shown in FIG. 1c, having a delta- and a Y-connection, respectively.

The principle of rotation is illustrated in the development view of FIG. 2 which shows the armature windings interconnected in a delta, i.e. ring, connection. The commutator 8 comprises commutator segments 8-1, 8-2, ..., 8-12, each subtending an angular space of 30° ($\frac{2}{3}$ of the angular width of the field magnet pole). Respective sets of the commutator segments 8-1, 8-4, 8-7, 8-10; segments 8-2, 8-5, 8-8; 8-11 and segments 8-3, 8-6, 8-9, 8-12 are each interconnected in common through respective lead wires. The numerals 11-1 and 11-2 indicate the brushes which are adapted to receive current respectively from positive and negative terminals 12-1 and 12-2 of a DC supply source. The angular spacing between the brushes 11-1 and 11-2, as shown in FIG. 2, is 135°, and any other value of the angular spacing of 45° (i.e., 360°/4mn, where m being a positive integer of 1 or more and n being a positive integer of 2 or more, and, in this case, m=1 and n=2) or 225° or 315° will, in principle, be equivalent to the first-mentioned value of 135°. In the state shown in FIG. 2, the current flows in the directions indicated by the arrows, i.e., there is a current flow which passes through the armature winding 7-2 and another current flow which passes through the armature windings 7-1 and 7-3, which latter current is half of the current through the armature winding 7-2. As a result of these current flows, torque is generated at each armature winding to drive the armature 7 in the direction of arrow A, and, accordingly, the commutator 8 is rotated in the direction of arrow B. Upon rotation of the armature 7 through 15°, the current will change to a flow passing through the winding 7-3 and another flow, which is half of the current through the armature winding 7-3, passing through the windings 7-1 and 7-2 to generate driving torque at each winding. With an additional rotation of 15°, the current will be changed again to a flow passing through the winding 7-1, and another flow, which is half of such current through the armature winding 7-1, passing through the windings 7-3 and 7-2, to generate driving torque at each winding. As is apparent, the torque which drives the armature is generated in succession. In addition to the above-described feature, the motor of the present invention has additional features especially suited to a disk type motor, such as high efficiency, making possible a motor structure having little hysteresis loss, and little unevenness in torque.

Figure 3:
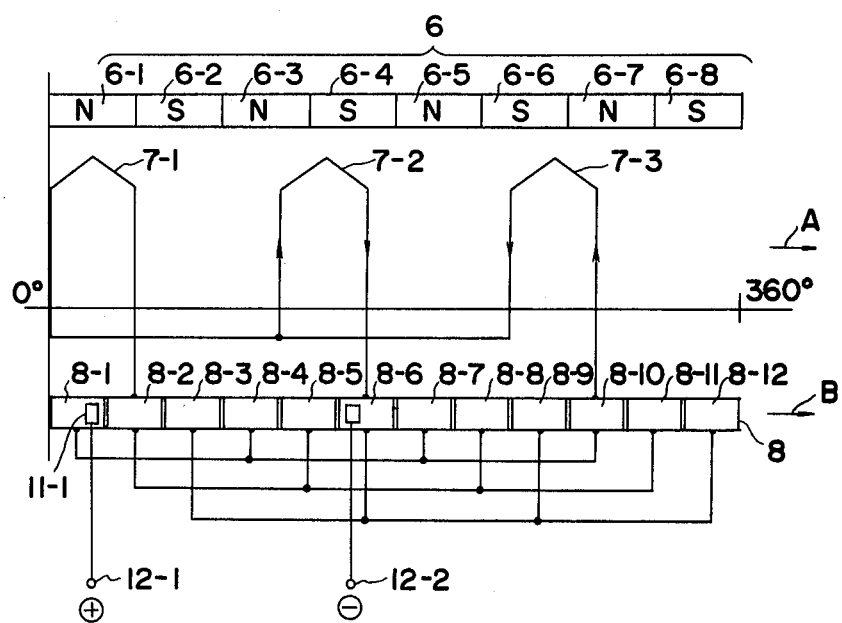

FIG. 3 illustrates another example of a motor embodiment in accordance with the present invention wherein the armature windings are interconnected in a Y-connection. Similar numerals indicate like parts as in FIG. 2, and a description thereof will be omitted. As shown in FIG. 3, start or termination ends of the respective armature windings are interconnected in common, and, in the state shown in FIG. 3, the other end of the armature winding 7-1 is connected to the commutator segment 8-2, the other end of the winding 7-2 to the segment 8-6, and the other end of the winding 7-3 to the segment 8-10. In the state shown in FIG. 3, the current flows in the directions indicated by the arrows, i.e., no current flows through the armature winding 7-1, generating no torque, while current flows through the armature windings 7-3 and 7-2 to generate torque at these latter two windings, thereby to drive the armature 7 in the direction of arrow A, and accordingly cause the commutator 8 to rotate in the direction of arrow B. Upon a 15° rotation of the armature, current will cease flowing through the winding 7-2, generating no torque, but will flow through the windings 7-3 and 7-1 to generate torque at these latter two windings. With a further 15° rotation, current will cease flowing through the winding 7-3, generating no torque, but will flow through the windings 7-2 and 7-1 to generate torque at these latter two windings. As can be appreciated, torque is generated in succession to drive the armature.

Though the above described embodiment is an application of the present invention into a commutator motor, the present invention can be likewise applied to a non-commutator motor, an embodiment of which is illustrated in connection with a direct-drive motor for a turn table (to be used in record players).

Figure 4:
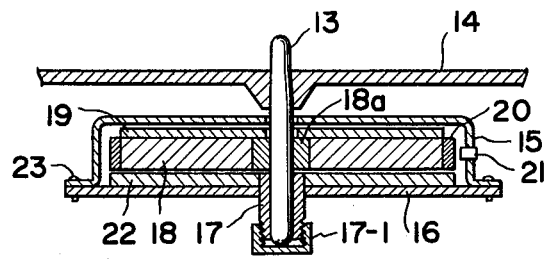
FIG. 4 is a partial, longitudinal, cross-sectional view of a non-commutator motor of the invention.

In FIG. 4, the numeral 16 indicates a housing plate which is made by press forming a soft steel plate. A bearing 17 is fixed to the housing plate 16. Also a housing 15, which is also made by press forming a soft steel plate, is fixed to the plate 16 by screws 23. A rotatable shaft 13 is rotatably journalled on bearing 17 and supports a turn table 14. Magnet rotor 18 is secured by a magnet holder 18a to the shaft 13. On the other periphery of the magnet rotor 18, a position detecting band 20 is fixed in a ring-like fashion. The magnet rotor 18, which constitutes a field thereof, is provided with alternate N- and S-polarities each subtending equal angular spaces of 45° as shown in FIG. 1b, which polarities are magnetized in the axial direction of the rotating shaft. A circular plate 19 made of soft steel is affixed onto an upper face of the magnet rotor to provide a magnetic path thereof. An armature 22 is secured onto an inner face of the housing plate 16. The armature 22, as shown in FIG. 1c, includes three sectorial armature windings embedded in equal pitches or spacings, that is, each within a 120° angular space. The angular spacing of those conductor portions of the sectorial armature windings that contribute to the generation torque is 45° which is equal to the angular width of each of the poles of the magnet rotor 18. The reference numeral 21 illustrates a support for at least one position detector, which support is retained on a through-hole portion provided in the housing 15. A lower portion of the bearing 17 has a male screw portion on its outer periphery to be threaded into a female screw to facilitate the adjustment of the rotating shaft 13 in its thrust direction.

Figure 5:
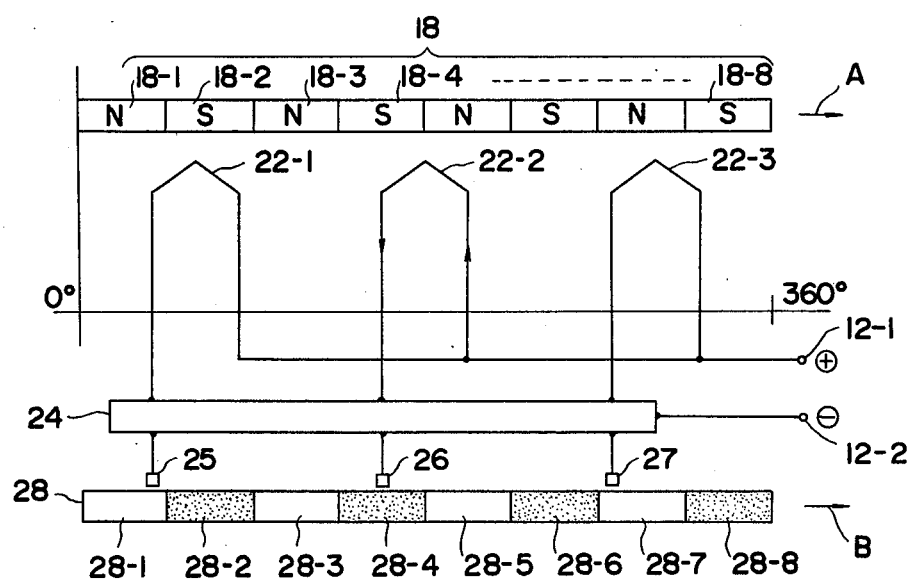
FIG. 5 is a developed view of an embodiment incorporating the motor of FIG. 4.

FIG. 5 shows a developed view of the non-commutator motor according to the above mentioned embodiment. The magnet rotor 18 consists of poles 18-1, 18-2, ... 18-8 which are alternately magnetized into N- and S-polarities. The rotor 18 rotates in a direction of arrow A. The armature windings 22-1, 22-2 and 22-3 are arranged in equal pitches, that is, each within a 120° angular space. The angular spacing of those conductor portions of the sectorial armature windings that contribute to the generation of torque is 45° which is equal to the angular width of each of the poles 18-1, 18-2, ... 18-8. An end of each of armature windings is connected in common to a positive terminal 12-1 of a D.C. power source, and the other ends of the windings are connected to a negative terminal 12-2 of the D.C. power source through a conventional current control circuit 24. The reference numerals 25, 26, and 27 illustrate position sensors, such as Hall devices, induction coils and the like. The angular spacing between the respective detectors is 120°. The position detectors 25, 26, and 27 are mounted on the support 21 shown in FIG. 4 facing against the position detecting band 20. In the case where the position detecting band 20 is composed of magnetic poles, the band can employ a leakage magnetic flux to the outside of the poles 18-1, 18-2, ... 18-8 of the magnet rotor 18. Alternatively, it is possible to dispose, on determined locations on the surface of the armature 22, respective Hall devices, in which case the support 21 may be omitted. In an example of FIG. 5, the position detecting band 28 includes dotted portions 28-2, 28-4, 28-6, and 28-8 which are magnetized into N-polarity, and portions 28-1, 28-3, 28-5, and 28-7 which are magentized into S-polarity. By the output of the Hall devices 25, 26, and 27 when faced with the N-polarity, the corresponding transistors contained in the current control circuit 24 are caused to conduct, resulting in the armature control. That is, only when the Hall device 25, 26, or 27 is faced to the S-polarity, the corresponding armature winding 22-1, 22-2 or 22-3 is energized. In the state shown in FIG. 5, the current flows in the direction indicated by the arrows, i.e. only by the output of the Hall device 26 the corresponding transistor contained in the current control circuit 24 is caused to conduct, resulting in energizing exclusively the armature winding 22-2 to generate torque so that the magnet rotor 18 and the position detecting band 28 rotate in the direction of arrows A and B, respectively. Upon rotation of the magnet rotor through 30°, only by the output of the Hall device 27, the armature winding 22-3 is exclusively energized to generate torque. With further rotation of 30°, only by the output of the Hall device 25 the armature winding 22-1 is exclusively energized to generate torque. Thus torque is generated in succession to drive the rotor. Since such energizing manner is like as that of conventional non-commutator motor, the invention constitutes a non-commutator motor with its magnet rotor 18 and position detecting bend 28 rotating in the direction of arrows A and B, respectively.

While, in the above-described embodiments, disk-shaped armatures are employed, it is apparent that the invention can also be applied to a cylindrical armature. According to the invention, for the number of 4n (n being a positive integer of 2 or more) of the field magnet poles, armature windings of (2n-1) in number are employed, the angular space of the armature winding being equal to the angular width of the field magnet pole. Thus, in the invention, other than the embodiments disclosed hereinbefore, various combinations of the numbers of field magnet poles and the numbers of armature windings can also be employed, such as, a combination of twelve field magnet poles and five armature windings, a combination of sixteen field magnet poles and seven armature windings, etc. Further, in the invention, for 4mn field magnet poles (m being a positive integer of 1 or more), m(2n−1) armature windings (m being a positive integer of 1 or more) may be employed, the armature windings being disposed in a non-superposed fashion with respect to each other on the armature.

While the invention has been described in connection with the preferred embodiments, it is to be understood that various changes and modifications can be made without departing from the spirit and scope of the invention.

What is claimed is:

1. A direct current motor comprising:
   a housing having at least a portion thereof formed of magnetic material;
   a shaft disposed centrally and journalled for rotation within said housing;
   a first element disposed within said housing comprising an annular field magnet having eight poles disposed centrally about said shaft, each said pole being magnetized into alternate N and S polarities in equal angular spaces;
   a second element disposed within said housing comprising an armature spaced from said field magnet and having three armature windings disposed thereon in non-superposed relationship in equal pitches with respect to each other and in a face-to-face relationship with respect to said field magnet poles;
   said portion of said housing formed of magnetic material closing the magnetic path of said field magnet and said armature being disposed in said magnetic path, each winding of said armature being formed and disposed thereon such that the angular spacing of those conductor portions thereof that contribute to the generation of torque is equal to the angular width of said field magent poles;
   one of said elements being fixed to said shaft and the other of said elements being fixed to said housing, said one of said elements being thereby made rotatable relative to the other of said elements.

2. A direct current motor comprising:
   a housing having at least a portion thereof formed of magnetic material;
   a shaft disposed centrally and journalled for rotation within said housing;
   a first element disposed within said housing comprising an annular field magnet having sixteen poles disposed centrally about said shaft, each said pole being magnetized into alternate N and S polarities in equal angular spaces;
   a second element disposed within said housing comprising an armature spaced from said field magnet and having six armature windings disposed thereon in non-superposed relationship in equal pitches with respect to each other and in a face-to-face relationship with respect to said field magnet poles;
   said portion of said housing formed of magnetic material closing the magnetic path of said field magnet and said armature being disposed in said magnetic path, each winding of said armature being formed and disposed thereon such that the angular spacing of those conductor portions thereof that contribute to the generation of torque is equal to the angular width of said field magnet poles;
   one of said elements being fixed to said shaft and the other of said elements being fixed to said housing, said one of said elements being thereby made rotatable relative to the other of said elements.

3. A direct current motor comprising:
a housing having at least a portion thereof formed of magnetic material;
a shaft disposed centrally and journalled for rotation within said housing;
a first element disposed within said housing comprising an annular field magnet having twelve poles disposed centrally about said shaft, each said pole being magnetized into alternate N and S polarities in equal angular spaces;
a second element disposed within said housing comprising an armature spaced from said field magnet and having five armature windings disposed thereon in non-superposed relationship in equal pitches with respect to each other and in a face-to-face relationship with respect to said field magnet poles;
said portion of said housing formed of magnetic material closing the magnetic path of said field magnet and said armature being disposed in said magnetic path, each winding of said armature being formed and disposed thereon such that the angular spacing of those conductor portions thereof that contribute to the generation of torque is equal to the angular width of said field magnet poles;
one of said elements being fixed to said shaft and the other of said elements being fixed to said housing, said one of said elements being thereby made rotatable relative to the other of said elements.

4. A direct current motor comprising:
a housing having at least a portion thereof formed of magnetic material;
a shaft disposed centrally and journalled for rotation within said housing;
a first element disposed within said housing comprising an annular field magnet having sixteen poles disposed centrally about said shaft, each said pole being magnetized into alternate N and S polarities in equal angular spaces;
a second element disposed within said housing comprising an armature spaced from said field magnet and having seven armature windings disposed thereon in non-superposed relationship in equal pitches with respect to each other and in a face-to-face relationship with respect to said field magnet poles;
said portion of said housing formed of magnetic material closing the magnetic path of said field magnet and said armature being disposed in said magnetic path, each winding of said armature being formed and disposed thereon such that the angular spacing of those conductor portions thereof that contribute to the generation of torque is equal to the angular width of said field magnet poles;
one of said elements being fixed to said shaft and the other of said elements being fixed to said housing, said one of said elements being thereby made rotatable relative to the other of said elements.

* * * * *